United States Patent
Pelster et al.

(10) Patent No.: US 12,360,889 B2
(45) Date of Patent: Jul. 15, 2025

(54) VALIDITY DISTRIBUTION FOR PERFORMANCE UNIFORMITY

(71) Applicant: SK hynix NAND Product Solutions Corp., San Jose, CA (US)

(72) Inventors: David J. Pelster, Rancho Cordova, CA (US); Mark Golez, Rancho Cordova, CA (US); Daniel R. McLeran, Rancho Cordova, CA (US); Nathan Koch, Rancho Cordova, CA (US); Paul Ruby, Rancho Cordova, CA (US)

(73) Assignee: SK hynix NAND Product Solutions Corp., San Jose, CA (US)

( * ) Notice: Subject to any disclaimer, the term of this patent is extended or adjusted under 35 U.S.C. 154(b) by 0 days.

(21) Appl. No.: 18/177,511

(22) Filed: Mar. 2, 2023

(65) Prior Publication Data
US 2024/0296121 A1    Sep. 5, 2024

(51) Int. Cl.
*G06F 12/02* (2006.01)
(52) U.S. Cl.
CPC .. *G06F 12/0253* (2013.01); *G06F 2212/1008* (2013.01)

(58) Field of Classification Search
CPC .............. G06F 2212/1008; G06F 12/0253
See application file for complete search history.

(56) References Cited

U.S. PATENT DOCUMENTS

| | | | |
|---|---|---|---|
| 8,626,987 B2 | 1/2014 | Jung et al. | |
| 2015/0026391 A1* | 1/2015 | Su | G06F 12/0253 711/103 |
| 2020/0226080 A1 | 7/2020 | Tarango et al. | |
| 2021/0240613 A1* | 8/2021 | Na | G06F 12/0253 |

* cited by examiner

*Primary Examiner* — Jane W Benner
(74) *Attorney, Agent, or Firm* — IP & T GROUP LLP

(57) ABSTRACT

A method and controller for operating a memory system in communication with a host. The method and controller logically arrange a sequence of reclaim sub-groups within a memory device. The method and controller process the reclaim sub-groups according to the sequence to control the memory device to perform garbage collection on the reclaim sub-groups in the memory device. In the sequence, the reclaim sub-groups are processed during the garbage collection such that at least one re-ordered data sequence in the sequence of the reclaim sub-groups being processed has re-ordered valid data that is not clumped.

20 Claims, 9 Drawing Sheets

FIG. 3

| Sub-group Index | Group Validity (Original) | Sub-group Index (re-ordered) | Group Validity (re-ordered) |
|---|---|---|---|
| 0 | 0 | 24 | 0 |
| 1 | 0 | 4 | 0 |
| 2 | 0 | 9 | 1 |
| 3 | 0 | 15 | 1 |
| 4 | 0 | 0 | 0 |
| 5 | 0 | 18 | 1 |
| 6 | 0 | 8 | 1 |
| 7 | 0 | 2 | 0 |
| 8 | 1 | 29 | 1 |
| 9 | 1 | 11 | 0 |
| 10 | 1 | 6 | 0 |
| 11 | 1 | 30 | 0 |
| 12 | 1 | 7 | 0 |
| 13 | 1 | 26 | 0 |
| 14 | 1 | 3 | 0 |
| 15 | 1 | 10 | 1 |
| 16 | 1 | 22 | 1 |
| 17 | 1 | 16 | 1 |
| 18 | 1 | 12 | 1 |
| 19 | 1 | 25 | 0 |
| 20 | 1 | 17 | 1 |
| 21 | 1 | 20 | 1 |
| 22 | 1 | 28 | 0 |
| 23 | 1 | 13 | 1 |
| 24 | 0 | 5 | 0 |
| 25 | 0 | 1 | 0 |
| 26 | 0 | 19 | 1 |
| 27 | 0 | 27 | 0 |
| 28 | 0 | 31 | 0 |
| 29 | 0 | 23 | 1 |
| 30 | 0 | 22 | 1 |
| 31 | 0 | 14 | 1 |

VALIDITY DISTRIBUTION FOR PERFORMANCE UNIFORMITY

BACKGROUND

1. Field

Embodiments of the present disclosure relate to operation of a memory device in communication with a host.

2. Description of the Related Art

Non-volatile memory refers to memory whose state is determinate even if power is interrupted to the device. A solid-state drive (SSD) is a storage device that stores data in non-volatile memory. Typically, the SSD includes a block-based memory such as NAND Flash and a controller to manage read/write requests received from a host communicatively coupled to the SSD directed to the NAND Flash.

When data stored in a block in a NAND Flash in the SSD is no longer needed, the data must be erased before one or more blocks storing the data can be used to store new data. Prior to erasing, valid data in the one or more blocks must be written (programmed) to other blocks in the NAND Flash. The writing of the valid data to other blocks and the NAND Flash erase operation are typically referred to as "garbage collection" (or "garbage collection operations"). Garbage collection operations include writing valid pages to other blocks in the NAND Flash and erasing blocks in NAND Flash after the valid pages have been written to other blocks in the NAND Flash. Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and SSDs. A memory system receives commands associated with a memory device from a host and process the commands on the memory device.

SUMMARY

In one embodiment of the invention, there is provided an operating method of a memory controller, the operating method logically arranges a sequence of reclaim sub-groups within a memory device; and processes the reclaim sub-groups according to the sequence to control the memory device to perform garbage collection on the reclaim sub-groups in the memory device, wherein in the sequence, the reclaim sub-groups are processed during the garbage collection such that at least one re-ordered data sequence in the sequence of the reclaim sub-groups being processed has re-ordered valid data that is not clumped.

In still another embodiment of the invention, there is provided a memory system having a controller and at least one memory device for data storage, wherein the controller is configured to: logically arrange a sequence of reclaim sub-groups within a memory device of the at least one memory device; and process the reclaim sub-groups according to the sequence to control the memory device to perform garbage collection on the reclaim sub-groups in the memory device, wherein in the sequence, the reclaim sub-groups are processed during the garbage collection such that at least one re-ordered data sequence in the sequence of the reclaim sub-groups being processed has re-ordered valid data that is not clumped.

In still another embodiment of the invention, there is provided an apparatus comprising: a memory device; and a controller configured to: identify a reclaim group of data in a memory device of the memory system, the memory device containing valid data and invalid data: divide and index the reclaim group into reclaim sub-groups; and perform garbage collection on the reclaim sub-groups according to a rearranged order of indices of the reclaim sub-groups.

Additional embodiments and aspects of the present invention will become apparent from the following description. It is to be understood that both the foregoing general description of the invention and the following detailed description are exemplary, but are not restrictive of the invention.

BRIEF DESCRIPTION OF THE DRAWINGS

FIG. 3 is a table depicting contiguous segments of valid data and contiguous segments of invalid data in solid state drive device;

DETAILED DESCRIPTION

Figure 1:
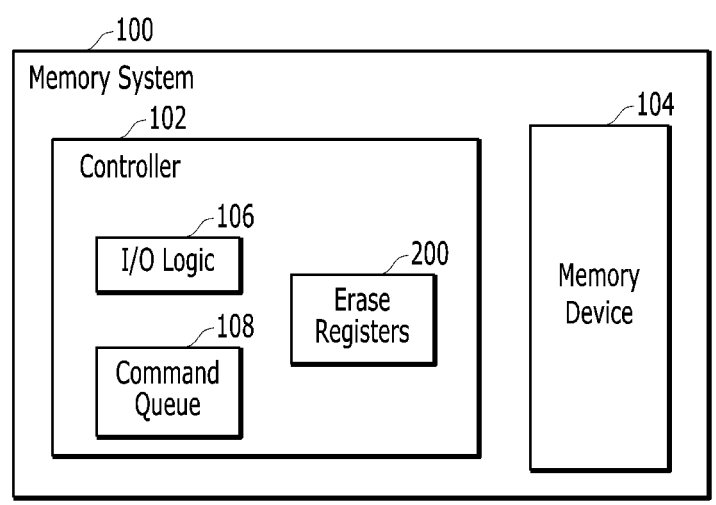
FIG. 1 is a diagram illustrating a non-volatile memory device in accordance with one embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process: an apparatus: a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment.

A detailed description of embodiments of the invention is provided below along with accompanying figures that illustrate aspects of the invention. The invention is described in connection with such embodiments, but the invention is not limited to any embodiment. The invention encompasses numerous alternatives, modifications and equivalents within the scope of the disclosure. Numerous specific details are set forth in the following description in order to provide an understanding of the invention. These details are provided for the purpose of example: the invention may be practiced according to the disclosure without some or all of the specific details.

Generally, performance metrics of memory systems (e.g., enterprise SSDs) include throughput in megabyte per second (MB/s) or input and output (IO) operations per second, and latency such as average or multi-nines latency profile. Multi-nines latency profile represents the worst command completion time in such nines portion (e.g., 99%, 99.9%), which is commonly referred as quality of service (QoS) measurement.

FIG. 1 illustrates an embodiment of a memory system 100 having a controller 102 and a memory device 104 of non-volatile memory cells. The memory system 100 being an electronic apparatus may function as both a memory device and/or a storage device in a computing system, and may be used to perform the role of volatile memory devices and disk drives in a computing system. In one embodiment, the memory system 100 may be a solid-state drive (SSD). The controller 102 includes Input/Output (I/O) logic 106 to manage read and write requests directed to the memory device 104 as well as logic to handle erase operations with respect to a block of pages of cells in the memory device 104. The I/O logic 106 may add read/write and erase commands to a command queue 108, from which the commands are accessed and executed. The I/O logic 106 may maintain erase registers 200 to manage erase operations. The controller 102 includes various other logic to perform these and other additional memory management operations. The memory system 100, the controller 102, and the memory device 104 may be formed on one or more substrates utilizing appropriate semiconductor and memory manufacturing processes.

In one embodiment of the invention, controller 102 is programmed or otherwise configured to reallocate the distribution of reclaim groups of data inside memory device 104. The memory device 104 may comprise an array of electrically erasable and non-volatile memory cells, such as flash storage devices. For instance, memory device 104 may comprise NAND dies of memory cells, also known as NAND chips or packages. In one embodiment, the NAND dies may comprise a multilevel cell (MLC) NAND flash memory that in each cell records two bit values, a lower bit value and an upper bit value. Alternatively, the NAND dies may comprise single level cell (SLC), triple level cell (TLC), quadruple level cell (QLC), penta-level cell (PLC), or any other suitable number of level cell NAND memories. Yet further, the NAND dies may comprise 3D NAND flash memory using floating gate cells. The storage array 104 may also comprise, but is not limited to, MLC NAND flash memory, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices.

Figure 2:
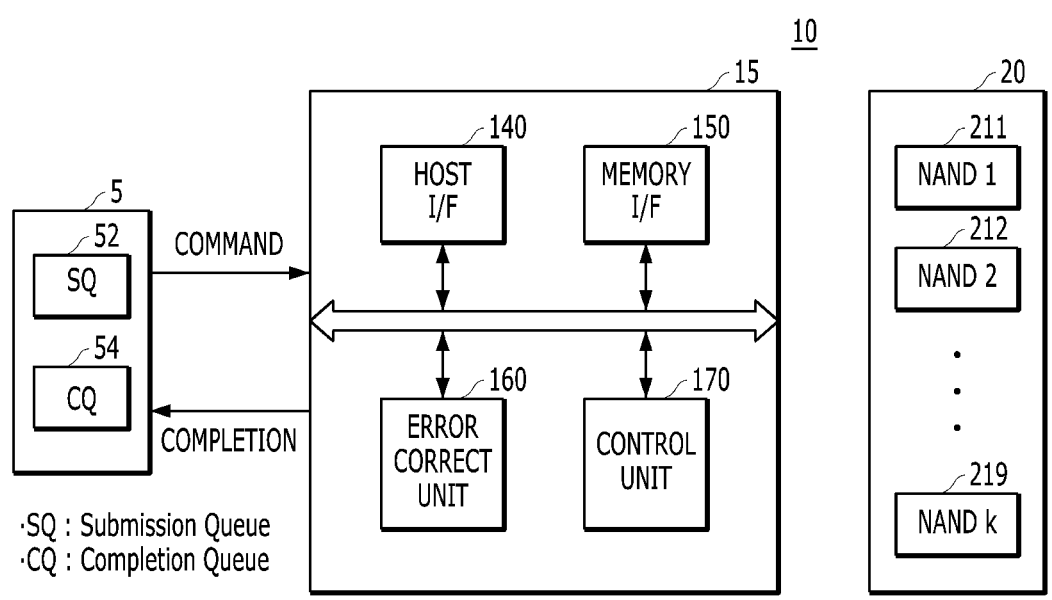
FIG. 2 is a diagram illustrating a memory system in accordance with one embodiment of the present invention.

FIG. 2 is a diagram illustrating a data processing system in accordance with another embodiment of the present invention.

Referring to FIG. 2, the data processing system shown may include a host 5 and a memory system 10 including a controller 15 and a memory device 20. The controller 15 and the memory device 20 may include the various components shown in FIG. 2 and as well as other components. In one embodiment of the invention, controller 15 is programmed or otherwise configured to reallocate the distribution of valid data inside solid state drives such as in the NAND devices shown in FIG. 2. While the explanation below is focused on non-volatile memory express (NVMe) SSD based terminologies, the present invention is not so limited and is applicable to other memory devices including different types of SSDs.

In the illustrated embodiment shown in FIG. 2, the memory system 10 may be implemented with a NVMe SSD, and the memory device 20 may be implemented with a plurality of memories in parallel, e.g., k NAND flash memories 210-1, 210-2, . . . 210-$k$ in parallel. The NAND flash memories (e.g., NAND dies) 210-1, 210-2, . . . 210-$k$ are coupled to the controller 15 through one or more channels.

The host 5 may exchange command requests and completions with and the memory system 10 via a predefined IO command queue structure. For example, the host 5 may include a submission queue (SQ) 52 and a completion queue (CQ) 54, which are paired as IO command queues. The submission queue 52 may store command requests associated with operations of the memory device 20, which are submitted to the controller 15. The completion queue 54 may receive completion notifications of command requests (e.g., items of data indicating that respective command requests have been completed) from the controller 15 and store the received completion notifications. The host 5 can recognize completion of each of the command requests as the corresponding completion data is put in the completion queue 54. In response to completion data being delivered to the completion queue 54, the host 5 may put new command(s) into the submission queue 52 to maintain a number of commands for processing by the memory system 10.

The controller 15 may include a host interface (I/F) 140, a memory interface (I/F) 150, an error correction (EC) unit 160, and a control unit 170. The components 160, 170 may be implemented with internal components (e.g., software (SW)) of the control component 120. Alternatively, or additionally, the components 160, 170 may be implemented with hardware (HW) components.

The EC unit 160 may detect and correct errors in the data read from the memory device 20 during the read operation.

The EC unit 160 may not correct error bits when the number of the error bits is greater than or equal to a threshold number of correctable error bits, and may output an error correction fail signal indicating failure in correcting the error bits.

In some embodiments, the EC unit 160 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and any other suitable codes and/or modulations. The EC unit 160 may include all circuits, systems or devices for the error correction operation.

The control unit 170 may control general operations of the memory system 10, and a write operation or a read operation for the memory device 20, in response to a write request or a read request from the host device. The control unit 170 may drive firmware, which is referred to as a flash translation layer (FTL), to control the general operations of the memory system 10. For example, the FTL may perform operations such as logical to physical (L2P) mapping, wear levelling, garbage collection, and bad block handling.

The host interface 140 may receive command requests from host 5. For example, the command requests may be associated with operations (e.g., read, write or erase operations) on the memory device 20. The control unit 170 may process the command requests to perform the command requests on the memory device 20.

The use of memory space typically leads to some degree of memory space fragmentation. That is, the processes of writing data to a memory space, deleting data from a memory space, and overwriting stored data in a memory space can result in fragmentation of available memory space which can slow reading and writing operations.

Garbage collection is an operation that reduces the degree of fragmentation within a memory, or within a file system controlling the allocation of space within a memory. Garbage collection conventionally reorganizes, concatenates, and/or compacts fragmented data (or fragmented data files) within a memory space. Unlike a hard disk, the operational speed of a memory system utilizing a flash memory is not as materially affected by the stored order (or relative physical location) of the stored data. That is, the discontinuous storing of data fragments across a range of memory blocks defined within the flash memory may not necessarily slow read/write performance as it typically does in a hard disk: however, numerous data transfers associated with the multiple copy operations (as may occur in garbage collection) can shorten the lifetime of a flash memory and affect the speed of the SSD as experienced by the host. Furthermore, additional system overhead required by numerous (and unnecessary) data transfers reduces the overall resources (CPU, back-end bandwidth, etc.) that are available to the host, and can adversely impact performance. The back-end bandwidth representing the available write bandwidth of for example memory device 20 of FIG. 2.

Moreover, in the context of the present invention, reclaim groups (e.g., sets of erase blocks in a source of data to be erased) continue to increase in size as the storage size of NAND devices increase over NAND generations. As used herein, a source of data refers to one or more NAND erase blocks that are operated on as a unit for garbage collection for the purpose of reclaiming the NAND blocks for new writes (e.g., for generating free space).

Moreover, there is an ever-increasing need for NAND bandwidth concurrency for larger erase blocks with different tasks such as for example host writing and block erasing running concurrently and targeted to different memory die in the NAND device. In general, more die will result in more concurrency which means better performance. However, for cost optimization, larger die are desired. Therefore, for the same SSD capacity using larger die, there is typically less concurrency unless measures such as in the present invention can maintain concurrent processing. Conventionally, during garbage collecting, an SSD such as a NAND device locates data that qualify for best merit relocation (that is a source of data having contiguous ranges of either valid data or invalid data).

In general, validity is not uniformly spread throughout a set of NAND erase blocks often resulting in a) the NAND device during garbage collection processing at rates higher than specified or b) having the host bandwidth slow to where there is time for the NAND to process all the data during a specified time quantum, or c) needing to provide extra storage in the host or in the NAND to store data until a data operation such as relocating valid data during garbage collection can occur. This data relocation as part of garbage collection may occur for example when data is first read from a location (such as for example from one or more NAND erase blocks noted above) and then the read data is written to a new location where the written data becomes valid data.

Moreover, processing large ranges of validity within reclaim groups fundamentally increases the NAND spare memory space required to cushion and absorb any free space consumption in order to maintain host input and output operational stability (IOPS). Previous solutions relied on bandwidth arbitration where an SSD can negotiate with the host for a particular speed of communication between the SSD and the host.

The present invention recognized that, in general, bandwidth arbitration (typically used with NAND memory space in order to reduce bandwidth and thereby cushion the host, especially when large ranges of valid data of a reclaim group were encountered) is not optimal. Additionally, spare memory space to cushion the host (the free memory space consumer) was often needed because garbage collection operations (the free memory space producer) would otherwise slow down when handling large chunks of valid data. Moreover, the present invention recognized that bandwidth arbitration often resulted in a) less NAND spare memory space being available which could otherwise be used to reduce write amplification (the amount of extra data written (from garbage collection) needed to write the same amount of host data), and/or b) periods of inferior host write performance when relocating large valid regions of a reclaim group.

One embodiment of the present invention minimizes the amount of spare memory space required for controlling IOPS by statistically spreading the processing of valid data in a reclaim group over multiple reclaim sub-groups. In one embodiment of the present invention, back-end bandwidth consumption (e.g., subsequent processing to compensate for not being able to write valid data for garbage collection in an allotted time), which would take bandwidth away from the host, is more evenly distributed or eliminated.

In this context, the present invention in one embodiment (as described in detail with regard to FIG. 3) provides a computational process in which a chosen reclaim group (containing valid and invalid data) is relocated by indexing its reclaim sub-groups from (0 . . . Max). This indexing is re-ordered (for example through a deterministic re-ordering or other re-ordering process) to produce a sequence for garbage collection. Such a re-ordered sequence is seen by comparison of the first column in FIG. 3 to the third column in FIG. 3. The re-ordered sequence contains the same data values associated with indices (0 to 31) as the original data sequence but is indexed for example in the order shown in the third column in which the re-ordered indices cover the same span of original indices (0 to 31) of the reclaim sub-groups but are scrambled (re-ordered) within that range. The result is that the original valid data in the reclaim group is more uniformly distributed for the process of garbage collecting, thus keeping the back-end bandwidth consumption more uniform, and ultimately keeping the host IOPS more stable.

Accordingly, in one aspect of the present invention, the host sees more consistent performance without periods of low performance associated with a high number of valid reclaim sub-groups of the reclaim group being clumped together.

In an illustrative example, consider a reclaim group for garbage collection divided up into 32 reclaim sub-groups. The indexing diagram in FIG. 3 shows the original "clumped" fully valid reclaim sub-groups (indexed 8-23) redistributed across all 32 reclaim sub-groups. Each reclaim sub-group is either 100% valid or 0% valid (i.e., invalid) with half the reclaim group being fully valid. (The validity may or may not be known at the time of processing.) Since the SSD does not necessarily know the spread of validity throughout the reclaim group before processing the relocations of the data, in one embodiment of the invention, a deterministic calculation may be used to re-order the reclaim sub-group indices into a new order which process the fully valid reclaim sub-groups more uniformly across (in this example) the set of 32 total reclaim sub-groups. As detailed later, this re-ordering of processing can occur in the present invention regardless of the SSD knowing before processing the validity spreads or not knowing before processing the validity spreads.

Figure 4:
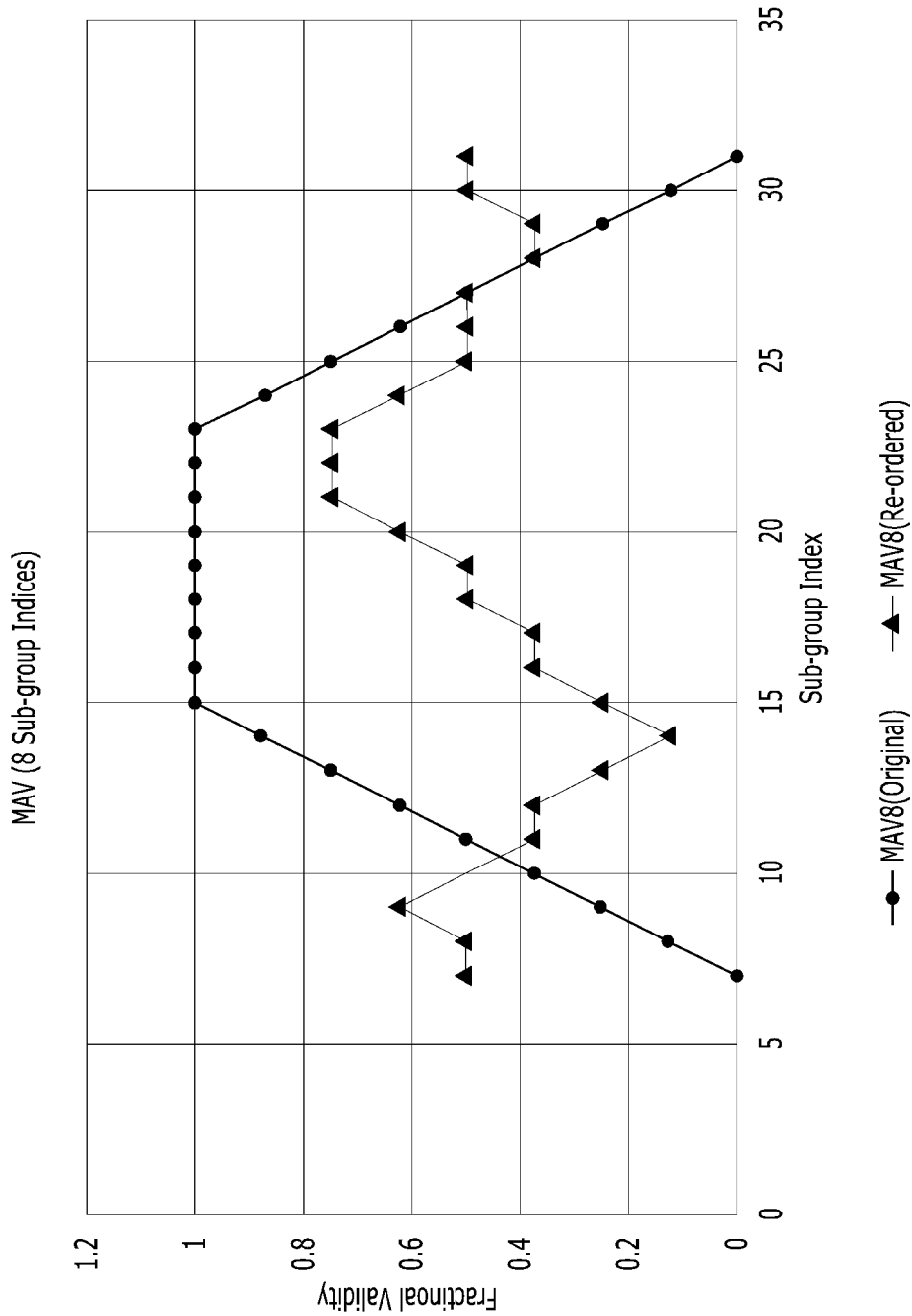
FIG. 4 is a graphical plot of a moving average for clumped and distributed valid data segments in accordance with one embodiment of the present invention.

FIG. 4 shows various attributes enabled by different embodiments of the present invention. In particular, FIG. 4 plots a moving average (MAV) of the fractional validity for 8 sub-groups (i.e., an average of the validity values for last 8 reclaim sub-groups being garbage collected) in each configuration: original and scrambled. In the original case, the MAV of the 8 reclaim sub-groups experiences a linear ramp from 0 to 100% valid for 8 consecutive sub-groups 7-15), a plateau (original sub-groups 15-23) and then a linear decrease back to 0 (original sub-groups 23-31). In the re-ordered case, the MAV for the 8 reclaim sub-groups, according to one embodiment of the present invention, traverses both higher and lower values, with a smaller dynamic range than for the original case. The data in FIG. 4 shows that a redistribution of the reclaim group validity across the original range of the reclaim group, according to another embodiment of the present invention, smooths out the maximum validity encountered by the moving average. This will result, according to another embodiment of the present invention, in smoother arbitration of the host bandwidth as a more gradual adjustment of the bandwidth allocated for reclaim sub-group relocation over time occurs with the redistribution.

Table 1 below provides the statistical summary of the MAV in FIG. 4.

|  | Original | Reordered |
|---|---|---|
| Min | 0 | 0.125 |
| Max | 1 | 0.75 |
| StdDev | 0.36 | 0.16 |

Table 1 shows minimum (Min), maximum (Max) and standard deviation (StdDev) of the moving average validity. In particular, table 1 shows that the standard deviation of the variation in MAV, in one embodiment of the present invention, is less than half in the scrambled (re-ordered) case versus the original case. A smaller standard deviation in the MAV means that, in one embodiment of the present invention, the impact on the host bandwidth can be mitigated and the increase in spare memory space needed to cushion the free space consumption during processing of a large range of validities during garbage collection can be minimized.

In this illustrative non-limiting example having the results shown in Table 1 and FIG. 4, the SSD is in steady state and the write amplification of the workload is 2, such that the average validity of the reclaim groups during the workload is 50%. If the ranges are processed in the original written order of the reclaim sub-groups (MAV8 original), the worst-case difference percentage to the average validity of the workload is (0.5−1)/0.5*100=100% (where 0.5 is the validity of the entire reclaim group expressed as a fraction and 1 is the maximum deviation taken from Table 1), meaning that ranges of validity processing are 100% off target to the average validity. Whereas re-ordering the order of the reclaim sub-groups (MAV8 scrambled), the worst-case difference percentage to the average validity of the workload is (0.5−0.75)/0.5*100=75%, which is an improvement of 25% (where 0.5 is the validity of the entre reclaim group expressed as a fraction and 0.75 is the maximum deviation taken from Table 1). In general, a smaller range of processing (that is processing with smaller reclaim sub-groups) improve the gap to the target average validity.

Figure 5:
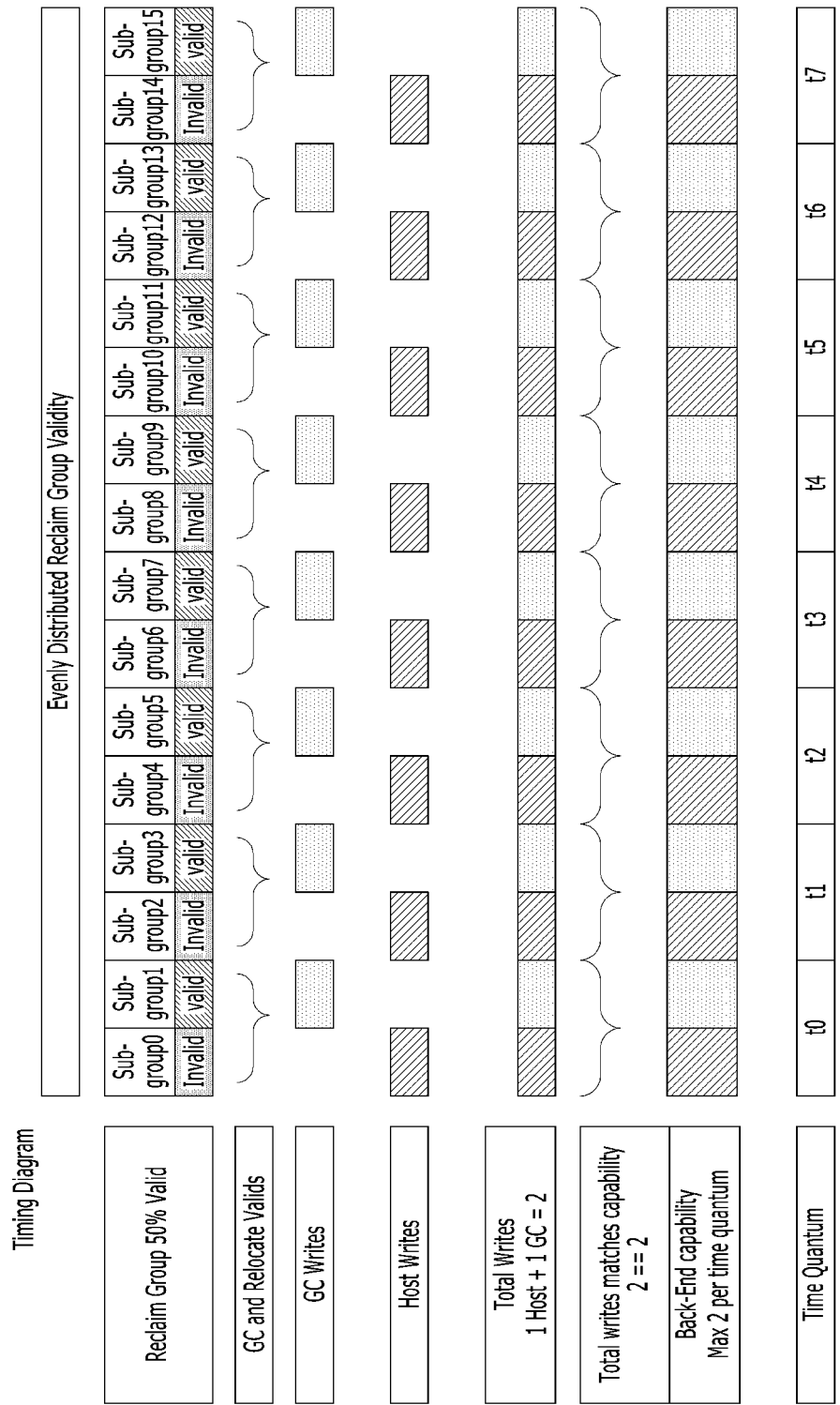
FIG. 5 is a timing diagram depicting an even distribution of valid data segments distributed across a reclaim group in a solid state drive.

To understand another aspect of the invention, consider again the scenario of a reclaim group that is 50% valid, divided into 16 reclaim sub-groups and an SSD backend bandwidth that can support up to two (2) writes concurrently during same time quantum. FIG. 5 illustrates (in the timing diagram shown) the effect of this processing scenario with an "ideal" evenly distributed reclaim sub-group validity having an interleaving invalid data segment between each pair of valid data segments. As used herein, the data pattern in FIG. 5 represents valid data that is not clumped, meaning that there is always an intervening invalid data segment in at least one re-ordered data sequence of the reclaim sub-groups.

Assume as in FIG. 5, that there is a write amplification of 2. In order to maintain a free space equilibrium such that garbage collection reclaims the same amount of free space that the host consumes, the garbage collection operation must a) scan a reclaim sub-group, b) relocate the data of one (1) valid. and c) reclaim the space from an invalid reclaim sub-group. In the example of FIG. 5, a single sub-group is either 100% valid or 100% invalid, and the reclaim group in this example is 50% valid.

With a typical garbage collection, from a full span random workload, where validity may be evenly distributed across an entire reclaim group, the garbage collection operation works well. The host always performs one write, and the garbage collection operation can make one write for every two reclaim sub-groups processed. The number of total writes for host and the garbage collection operation writes during the same time quantum is two (2), which is exactly what the back end bandwidth is capable of in this scenario.

Figure 6:
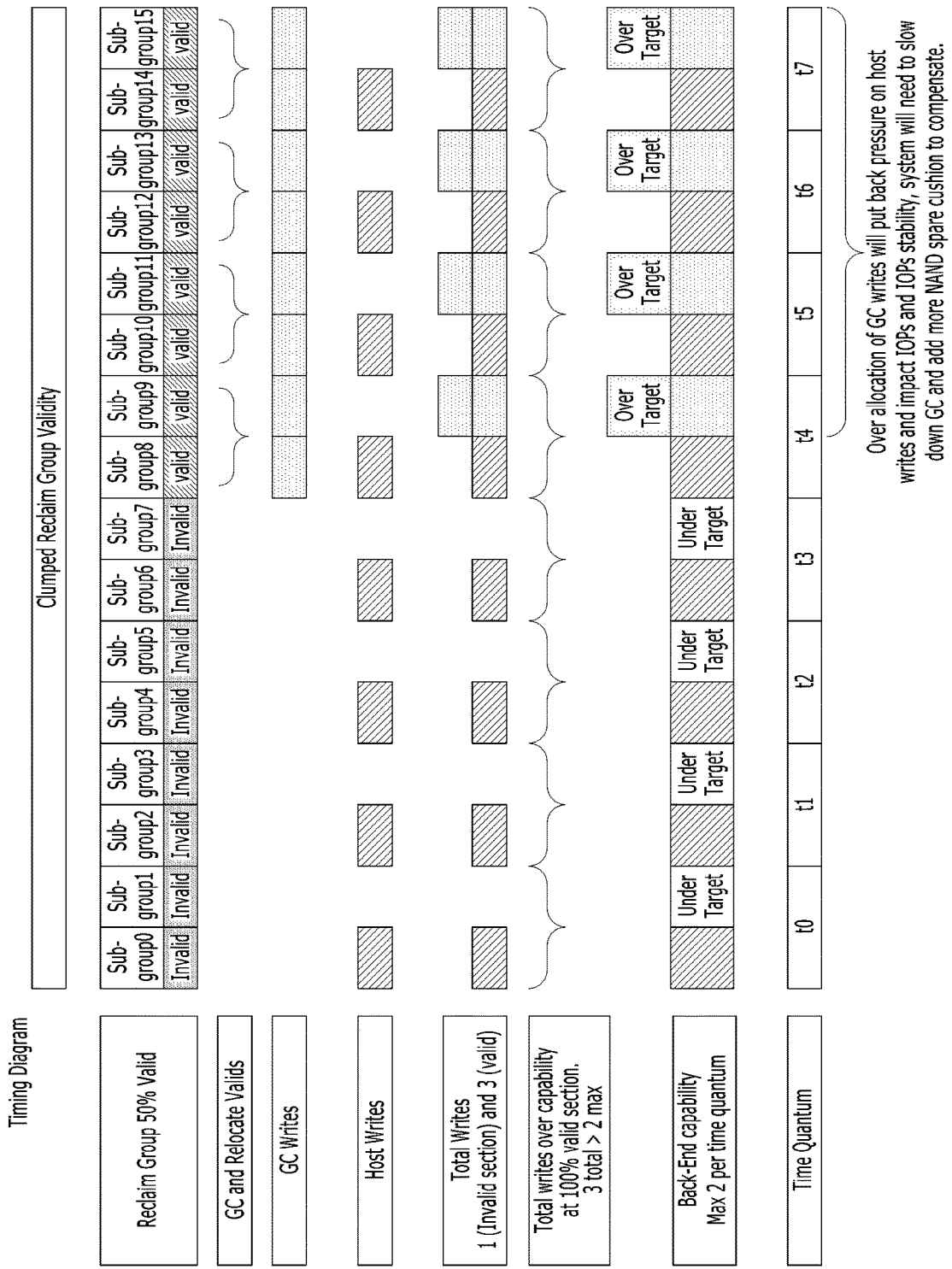
FIG. 6 is a timing diagram depicting a clumped distribution of valid data segments across half of a reclaim group in a solid state drive.

Next consider the same 50% valid reclaim group, where the first 50% of the reclaim sub-groups (from t0 to t3) is 100% invalid and the next 50% of the reclaim sub-groups (t4-t7) is 100% valid. FIG. 6 illustrates (in the timing diagram shown there) the effect of this processing scenario with this "clumped" validity.

In this scenario, for the 50% invalid section, the host continues to do one (1) write per time quantum and the garbage collection will do zero (0) write operations during the same time quantum because sub-groups are invalid, and with invalid data there is nothing to relocate or write for garbage collection. There is no issue in the 50% invalid section since the total number of writes (1) per time quantum is less than the back-end bandwidth of 2 per time quantum.

An issue occurs when processing the last 50% of the reclaim group that is 100% valid. The host continues to do one (1) write per time quantum, and the garbage collection will need to do two (2) write operations during the same time quantum since both of the reclaim sub-groups being processed in the time quantum are valid and need to be relocated and subsequently saved. In this section of the reclaim group that is 100% valid, the total writes per time quantum equals three (3) exceeding the SSD back-end bandwidth of 2 per time quantum in this scenario. The extra garbage collection write will consume NAND cushion spare and/or create back-pressure on host writes in-progress, impacting host IOPS and memory device IOPS stability, as eventually the remaining writing of the valid data (which was not written in the time quantum) has to occur.

One issue being addressed with the invention is that, if a garbage collection operation is constantly reading and writing valid data from one memory cell to another (as shown in FIG. 6), there are four instances where the total writes exceed the bandwidth of 2 writes per time quantum (in this example). If the excess writing is not addressed, then the processing speed will be slowed and/or more buffer space (as for example from the host or from NAND cushion spare typically provided to permit the NAND to accommodate burst of data from the host) may be required during garbage collection.

Figure 7:
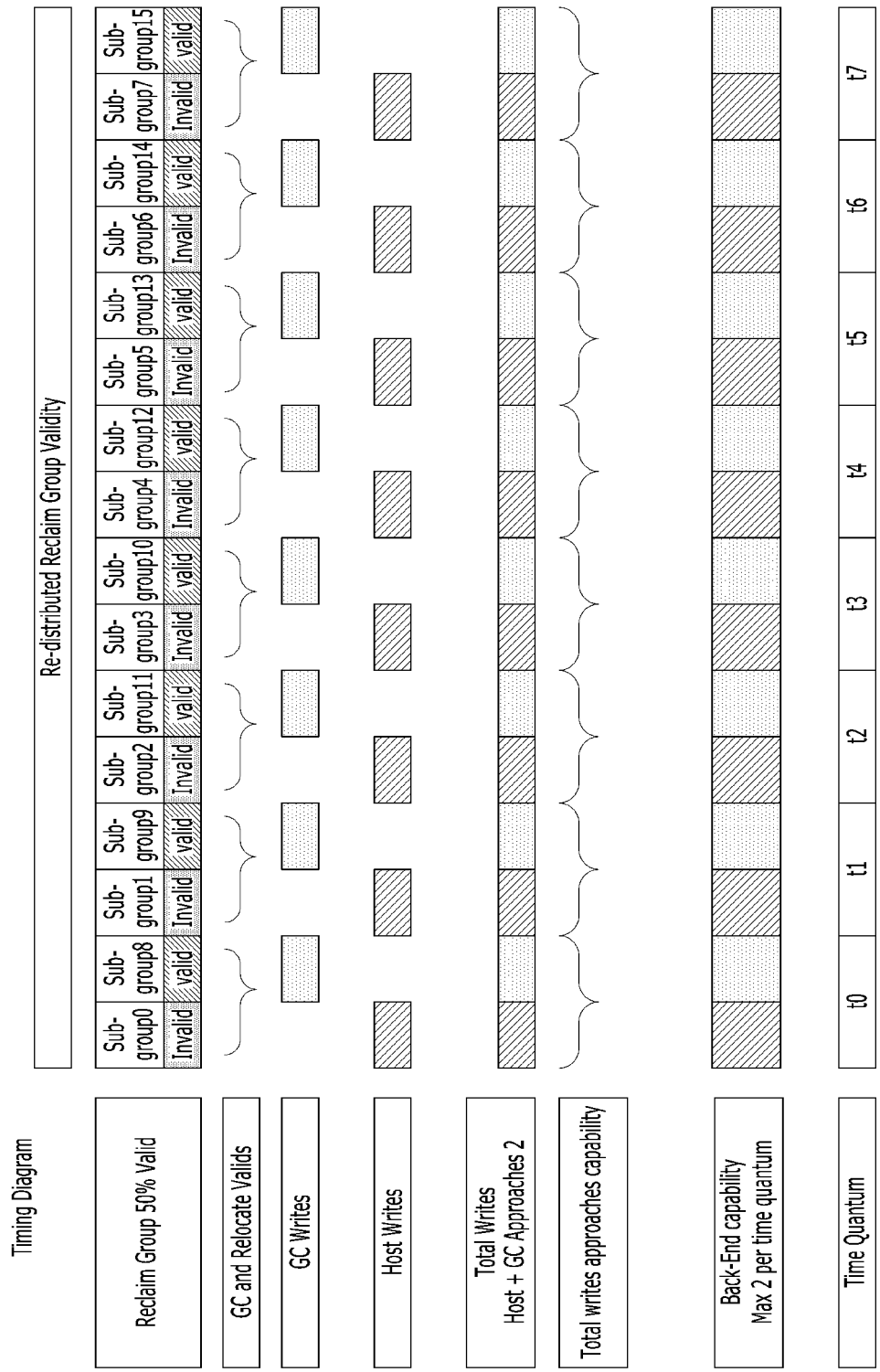
FIG. 7 is a timing diagram depicting a redistribution of valid data segments of FIG. 6 across the reclaim group in accordance one embodiment of the present invention.

In one aspect of the invention, a redistribution of a clumped validity across the original reclaim group can mitigate the impact on host bandwidth and minimize the increase in spare memory space needed to cushion the free space consumption during processing of a large range of validities inside the reclaim group. FIG. 7 illustrates in the timing diagram shown therein the effect of this inventive processing scenario with the redistribution of the reclaim group validity.

After this redistribution, as shown in FIG. 7, there are no instances where the total writes per time quantum exceeds 3 as compared to the four (4) instances of "over target" in FIG. 6. Hence, the garbage collection operation runs without the host being slowed by excess write operations.

In another aspect of the invention, the SSD control (such as for example controller 102 or control unit 170) has the capability to determine the validity of each reclaim subgroup before processing the relocation of data in the reclaim group. In one embodiment, the SSD control calculates a percentage of the validity of each reclaim sub-group. In one embodiment, the SSD control determines a validity percentage for each reclaim sub-group relative to a total percentage of the valid data in the reclaim group of the original data. For example, the SSD may keep track of valid locations in a reclaim group and may also keep track of the reclaim group's size (at different levels). From this knowledge, a validity percentage of the reclaim group and each reclaim sub-group can be calculated. In another embodiment, the SSD control sorts the reclaim sub-groups, from smallest validity percentage to highest validity percentage. In another embodiment, the SSD control determines a processing list by alternating processing a reclaim sub-group from a head of the list, then the tail of the list, resulting in a "low percentage", "high percentage", "low percentage", "high percentage" reclaim sub-group processing order.

In another aspect of the invention, the SSD control has the capability to set the time quantum and the number of maximum writes for a reclaim sub-group based on a target ratio such that the target ratio of the maximum writes in a reclaim sub-group to total writes for the reclaim group provides for proper write amplification for larger reclaim sub-groups and larger time quantum than depicted in FIGS. 5-7.

In another embodiment of the invention, the number of data segments in one of the reclaim sub-groups is not limited to that shown in FIGS. 5-7 or to any particular number of data segments per reclaim sub-group. In the examples shown in FIGS. 6 and 7, only one valid or invalid data segment is included in the reclaim sub-group, and two sub-groups are processed per time quantum. In the example of FIG. 7, re-ordering the reclaim sub-groups re-distributes the valid and invalid data segments across the reclaim group. FIG. 7 shows sixteen (16) sub-groups which, after their re-ordering, the garbage collection processing proceeds in the order of sub-group 0, sub-group 8, sub-group 1, sub-group 9, sub-group 2, sub-group 11, sub-group 3, sub-group 10, sub-group 4, sub-group 12, sub-group 5, sub-group 13, sub-group 6, sub-group 14, sub-group 7, sub-group 15. In this way, with the re-ordering of the reclaim sub-groups, at least one re-ordered data sequence in the sequence of the reclaim sub-groups being processed has valid data that is not clumped, and indeed in this example all the re-ordered data in the sequence of the reclaim sub-groups being processed has valid data that is not clumped.

In one embodiment of the invention (as illustrated above), data clumping over a time quantum of available bandwidth is minimized or otherwise reduced (as compared to the clumping in the original data distribution) and thereby minimizes or otherwise reduces the required memory spare or the impact to IOPs stability over large ranges of validity processing during garbage collection.

The present invention is not limited to the size of the reclaim sub-group shown in FIGS. 5-7, and the reclaim sub-group may be defined to be any size less than or equal to the reclaim group. Furthermore, the re-ordering of the reclaim sub-groups can be occur in multiple re-ordering steps and using the same or differently sized reclaim sub-groups.

Computational Process

Figure 8:
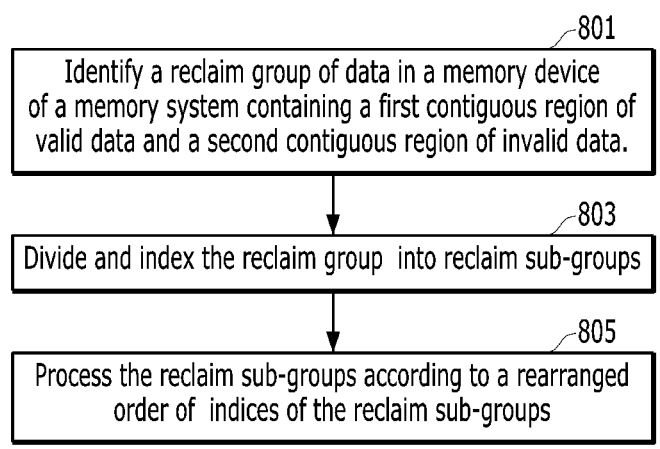
FIG. 8 is a flowchart illustrating a method for operating a memory device in accordance with one embodiment of the present invention.

FIG. 8 is a flow chart depicting a method for operating a memory system in communication with a host (where the method may be programmed for example as a computation algorithm). At 801, a reclaim group of data (e.g., original data prior to reclaiming) in a memory device of the memory system containing a first contiguous region of valid data and a second contiguous region of invalid data is identified. At 803, the reclaim group is divided and indexed into reclaim sub-groups. At 805, process the reclaim sub-groups according to a rearranged order of indices of the reclaim sub-groups.

In this method, the dividing the reclaim group into the reclaim sub-groups can index the valid data into sub-group index values for example by generating a deterministic sequence for each reclaim sub-group that contains wholly valid data, wholly invalid data, or mixed valid and invalid based on a validity percentage The sub-group index values may identify the reclaim sub-groups containing the same data values as the original data.

Figure 9:
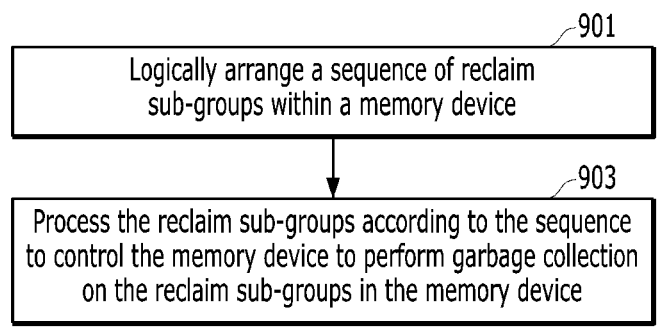
FIG. 9 is a flowchart illustrating an operating method of a memory controller in accordance with one embodiment of the present invention.

FIG. 9 is a flow chart depicting an operating method of a memory controller in accordance with one embodiment of the invention. At 901, the operating method logically arranges a sequence of reclaim sub-groups within a memory device. At 903, the controller processes the reclaim sub-groups according to the sequence to control the memory device to perform garbage collection on the reclaim sub-groups in the memory device. Here, in the sequence, the reclaim sub-groups are processed during the garbage collection such that at least one re-ordered data sequence in the sequence of the reclaim sub-groups being processed has re-ordered valid data that is not clumped.

In the inventive method of FIG. 9, before logically arranging the sequence of reclaim sub-groups, the method may identify a reclaim group of the data with valid data and invalid data, divide the reclaim group into the reclaim sub-groups, and index the reclaim sub-groups with indices ranging to a maximum index. While a reclaim group's validity is typically known, validity of the reclaim sub-groups could either be known or unknown. If the validity of the reclaim sub-groups are unknown, then then the standard deviation of sub-groups percentage validity to the percentage of the validity of the entire group can be improved with random re-ordering of the sub-groups relocation scheduling.

Therefore, in one embodiment where the reclaim sub-group validity is not known, the method may process the reclaim sub-groups by generating a random sequence of the indices having a deterministic pseudorandom order. The method may process the valid reclaim group according to a rearranged order of indices based on the random sequence of the indices having the deterministic pseudorandom order. Alternatively, the method may calculate the percentage of the validity of each reclaim sub-group, sort the sub-groups from smallest validity percentage to highest validity percentage, then create a reclaim sub-group processing list by alternating processing a reclaim sub-group from head, then the tail of the list, resulting in a "low percentage", "high percentage", "low percentage", "high percentage" sub-group processing order."

In the inventive method of FIG. 9, the reclaim sub-groups may be used to perform garbage collection on the memory device according to the rearranged order, with the valid data in the reclaim sub-groups being the same valid data as found in the reclaim group. In the inventive methods of FIGS. 8 and 9, the reclaim sub-groups can be indexed according to the sub-group index values.

In these methods, a validity percentage can be determined for each reclaim sub-group relative to a total percentage of the valid data in the reclaim group of the original data. In these methods, the sub-groups can be sorted from smallest validity percentage to highest validity percentage.

If the validity of the reclaim sub-groups are known, the re-ordering of the relocation scheduling of the sub-groups is discussed below. In this method, a sub-range processing list can be determined by alternating processing between a low percentage reclaim sub-group to a high percentage reclaim sub-group until all the reclaim sub-groups are processed.

In the inventive methods of FIGS. 8 and 9, the memory device can be subjected to garbage collection based on the sub-groups of the valid data with the index order rearranged while preserving the original data.

Accordingly, in a different embodiment of the present invention, there is provided a controller (such as controller 102 in FIG. 1) for operating a memory system in communication with a host. The controller is configured to: identify a reclaim group of data (e.g., original data prior to reclaiming) in a memory device of the memory system containing a first contiguous region of valid data and a second contiguous region of invalid data: divide and index the reclaim group into reclaim sub-groups; and process the reclaim sub-groups of the valid data according a rearranged order of indices of the sub-groups.

In this embodiment, the controller can be configured to index the valid data into sub-group index values for each reclaim sub-group for example by generating a random sequence (e.g., from a deterministic random sequence) for each reclaim sub-group containing wholly valid data. The index values identify the reclaim sub-groups containing the same data values as the original data.

In another embodiment, the controller may logically arrange a sequence of reclaim sub-groups within a memory device, each of the reclaim sub-groups being wholly valid or invalid or mixed valid and invalid based on a validity percentage (as at 901 of FIG. 9).

In yet another embodiment, the controller can be configured to place the reclaim sub-groups in the reclaim group according to the sub-group index values. The controller can be configured to determine a validity percentage for each reclaim sub-group relative to a total percentage of the valid data in the reclaim group of the original data. The controller can be configured to sort the reclaim sub-groups from smallest validity percentage to highest validity percentage. The controller can be configured to determine a sub-range processing list by alternating processing between a low percentage reclaim sub-group to a high percentage reclaim sub-group until all the reclaim sub-groups are processed. In this embodiment, the controller can be configured to perform garbage collection on the memory device based on the reclaim sub-groups of the valid data relocated while preserving the original data.

In another aspect, there is provided a computer program product for operating a memory system (such as memory system 10 in FIG. 2 in communication with host 5), wherein execution of the computer program product on a controller of the memory device programs the controller to: identify a reclaim group of data (e.g., original data prior to reclaiming) in a memory device of the memory system containing valid data and invalid data: divide and index the reclaim group into reclaim sub-groups being wholly valid or invalid or mixed valid and invalid based on a validity percentage; and process the reclaim sub-groups according to a rearranged order of the indices.

In another aspect, there is provided a memory system (such as memory system 10 in FIG. 2 in communication with host 5). The system includes a controller and at least one memory device. The controller is configured to: identify a reclaim group of data (e.g., original data prior to reclaiming) in the memory device (of the at least one memory device) for data storage containing valid data and invalid data; divide and index the reclaim group into reclaim sub-groups being wholly valid or invalid or mixed valid and invalid based on a validity percentage; and process (e.g., perform garbage collection on) the reclaim sub-groups according to a rearranged order of the indices.

In this memory system, the controller may be configured to: identify a reclaim group of data with valid data and invalid data, divide the reclaim group into the reclaim sub-groups, and index the reclaim sub-groups with indices ranging to a maximum index. In this memory system, the controller may be configured to generate a random sequence of the indices having the deterministic pseudorandom order. In this memory system, the controller may be configured to perform garbage collection on the valid data according to a rearranged order of indices based on the random sequence of the indices having the deterministic pseudorandom order.

In this memory system, the controller may be configured to determine a sub-range processing list by alternating processing between a low percentage reclaim sub-group to a high percentage reclaim sub-group until all the reclaim sub-groups are processed. In this memory system, the controller may be configured to perform garbage collection on the memory device based on the reclaim sub-groups of the valid data relocated and preserving the valid data.

In this memory system, the controller may be configured to: identify a reclaim group of data with valid data and invalid data, and divide the reclaim group. In this memory system, the controller may be configured to: perform garbage collection on the valid data according to the rearranged order. The valid data being subject to garbage collection may comprise the same valid data as found in the reclaim group. The controller may be configured to determine a validity percentage for each reclaim sub-group relative to a total percentage of the valid data in the reclaim group. the controller is configured to sort the reclaim sub-groups from smallest validity percentage to highest validity percentage. The controller may be configured to perform garbage collection on the memory device based on the reclaim sub-groups of the valid data while preserving the valid data.

In another aspect, there is provided an apparatus comprising: a memory device; and a controller configured to: identify a reclaim group of data in a memory device of the memory system, the memory device containing a first contiguous region of valid data and a second contiguous region of invalid data: divide and index the reclaim group into reclaim sub-groups; and process the reclaim sub-groups according a rearranged order of indices of the reclaim sub-groups.

In another aspect, there is provided a controller comprising a control logic that performs, when executed, operations including: logically arranging, into a deterministic pseudorandom order, a sequence of reclaim sub-groups within a memory device, each of the reclaim sub-groups being wholly valid or invalid or mixed valid and invalid based on a validity percentage; and processing the reclaim sub-groups according to the order to perform garbage collection on the reclaim sub-groups in the memory device.

In another aspect, there is provided a method for performing garbage collection on a sequence of reclaim sub-groups within a memory device, the method comprising: logically arranging the sequence into a deterministic pseudorandom order, each of the reclaim sub-groups being wholly valid or invalid or mixed valid and invalid based on a validity percentage; and performing the garbage collection on the reclaim sub-groups according to the deterministic pseudorandom order.

In another aspect, there is provided an apparatus comprising: a memory device including a sequence of reclaim sub-groups; and a controller configured to: logically arrange the sequence into a deterministic pseudorandom order, each of the reclaim sub-groups being wholly valid or invalid or mixed valid and invalid based on a validity percentage, and perform garbage collection on the reclaim sub-groups according to the deterministic pseudorandom order.

In another aspect, there is provided an electronic apparatus comprising: one or more substrates; and a controller coupled to the substrates, the controller including circuitry configured to: logically arrange, into a deterministic pseudorandom order, a sequence of reclaim sub-groups a memory device, each of the reclaim sub-groups being wholly valid or invalid, and perform garbage collection on the reclaim sub-groups according to the deterministic pseudorandom order.

In another aspect, there is provided a method for controlling a memory device including a sequence of reclaim sub-groups, the method comprising: logically arranging the sequence into a deterministic pseudorandom order, each of the reclaim sub-groups being wholly valid or invalid; and performing garbage collection on the reclaim sub-groups according to the deterministic pseudorandom order.

In another aspect, there is provided a method for controlling a memory device, the method comprising: logically rearranging, into an order of processing, an original sequence of reclaim sub-groups within a memory device, each of the reclaim sub-groups containing data being wholly valid or invalid or mixed valid and invalid based on a validity percentage; and performing garbage collection on the reclaim sub-groups in the memory device by processing the reclaim sub-groups according to the order of processing. In this method, the order of processing processes a higher number of invalid reclaim sub-groups between valid reclaim sub-groups as compared to processing in the original sequence.

In this method, the order of processing minimizes over-allocation of a write resource during any time quantum of the garbage collection. By not over allocating a write resource, the lifetime of an SSD can be prolonged and the impact to host during the garbage collection process can be reduced. In this method, the order of processing may comprise a deterministic pseudorandom order.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives recognized by one skilled in the art.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, or a combination of one or more of them. The terms such as "processor," "controller," "control unit," or "memory system" encompass apparatus, devices, and machines for processing data, including by way of example a programmable processor, a computer, or multiple processors or computers. The apparatus, devices, and machines for processing data can include, in addition to hardware, code that creates an execution environment for the computer program in question, e.g., code that constitutes processor firmware, a protocol stack, a database management system, an operating system, or a combination of one or more of them.

A computer program (also known as a program, firmware, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The computer program can be embodied as a computer program product as noted above containing a computer readable medium.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or from programmable non-volatile memory. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

What is claimed is:

1. An operating method of a memory controller, the operating method comprising:
   logically arranging reclaim sub-groups of a reclaim group within a memory device to produce an ordered sequence of the reclaim sub-groups, wherein the reclaim group is comprised of first and second valid reclaim sub-groups having only valid data and at least one invalid reclaim sub-group having no valid data, wherein the reclaim group has clumped valid data, wherein the clumped valid data comprises the first valid reclaim sub-group directly adjacent to the second valid reclaim sub-group;
   wherein a portion of the ordered sequence is rearranged to comprise a re-ordered data sequence by moving the at least one invalid reclaim sub-group in between the first valid reclaim sub-group and the second valid reclaim sub-group; and
   processing the reclaim sub-groups during garbage collection on the memory device according to the re-ordered data sequence.

2. The method of claim 1, wherein, before the logically arranging,
   dividing the reclaim group into the reclaim sub-groups, and
   indexing the reclaim sub-groups indices ranging to a maximum index.

3. The method of claim 2, further comprising generating a sequence of the indices having a deterministic order which re-orders the indices.

4. The method of claim 3, further comprising processing the valid data according to the deterministic order.

5. The method of claim 4, wherein the processing the reclaim sub-groups comprises performing the garbage collection on the memory device according to the deterministic order.

6. The method of claim 1, wherein the reclaim sub-groups being processed comprises the same valid data as found in the reclaim group.

7. The method of claim 1, further comprising determining a validity percentage for each reclaim sub-group relative to a total percentage of valid data in the reclaim group.

8. The method of claim 7, further comprising sorting the reclaim sub-groups from smallest validity percentage to highest validity percentage.

9. The method of claim 7, further comprising determining a sub-range processing list by alternating processing between a first reclaim sub-group and a second reclaim sub-group until all the reclaim sub-groups are processed, wherein the first reclaim sub-group has a lower validity percentage than the second reclaim sub-group.

10. The method of claim 1, further comprising performing garbage collection on the memory device based on the reclaim sub-groups of valid data while preserving wholly valid data.

11. A memory system comprising:
    a controller and at least one memory device for data storage, wherein the controller is configured to:
    logically arrange reclaim sub-groups of a reclaim group within a memory device of the at least one memory device to produce an ordered sequence of the reclaim sub-groups, wherein the reclaim group is comprised of first and second valid reclaim sub-groups having only valid data and at least one invalid reclaim sub-group having no valid data, wherein the reclaim group has clumped valid data, wherein the clumped valid data comprises the first valid reclaim sub-group directly adjacent to the second valid reclaim sub-group;

wherein a portion of the ordered sequence is rearranged to comprise a re-ordered data sequence by moving the at least one invalid reclaim sub-group in between the first valid reclaim sub-group and the second valid reclaim sub-group; and process the reclaim sub-groups during garbage collection on the memory device according to the re-ordered data sequence.

12. The system of claim 11, wherein the controller is configured to:

divide the reclaim group into the reclaim sub-groups, and index the reclaim sub-groups with indices ranging to a maximum index.

13. The system of claim 12, wherein the controller is configured to generate a sequence of the indices having a deterministic order which re-orders the indices.

14. The system of claim 13, wherein the controller is configured to process the valid data according to the deterministic order.

15. The system of claim 14, wherein the controller is configured to perform the garbage collection on the at least one memory device according to the deterministic order.

16. The system of claim 11, wherein the reclaim sub-groups being processed comprises the same valid data as found in the reclaim group.

17. The system of claim 11, wherein the controller is configured to determine a validity percentage for each reclaim sub-group relative to a total percentage of the valid data in the reclaim group.

18. The system of claim 17, wherein the controller is configured to sort the reclaim sub-groups from smallest validity percentage to highest validity percentage.

19. The system of claim 17, wherein the controller is configured to determine a sub-range processing list by alternating processing between a first reclaim sub-group and a second reclaim sub-group until all the reclaim sub-groups are processed, wherein the first reclaim sub-group has a lower validity percentage than the second reclaim sub-group.

20. An apparatus comprising:

a memory device; and a controller configured to:

identify a reclaim group of data in a memory device of the memory system, the memory device containing valid data and invalid data, wherein the reclaim group is comprised of first and second valid reclaim sub-groups having only valid data and at least one invalid reclaim sub-group having no valid data;

divide and index the reclaim group into reclaim sub-groups having an order of processing associated with indices of the reclaim sub-groups, wherein the order of processing has the first valid reclaim sub-group directly adjacent to the second valid reclaim sub-group; and perform garbage collection on the reclaim sub-groups according to a rearranged order of the indices of the reclaim sub-groups, wherein the rearranged order has the at least one invalid reclaim sub-group in between the first valid reclaim sub-group and the second valid reclaim sub-group, wherein the reclaim sub-groups are processed during the garbage collection according to the rearranged order.

* * * * *